2 Sheets--Sheet 1.

J. H. THORP.

Coal Oil-Stoves.

No. 5,989. Reissued July 28, 1874.

Witnesses

Edw. W. Donn

W. Gardner

Inventor

James Henry Thorp

THE GRAPHIC CO. PHOTO-LITH. 39 & 41 PARK PLACE, N.Y.

2 Sheets--Sheet 2.

J. H. THORP.

Coal Oil-Stoves.

No. 5,989. Reissued July 28, 1874.

Witnesses

Edw. W. Down

M Gardner

Inventor

James Henry Thorp

THE GRAPHIC CO. PHOTO-LITH. 39 & 41 PARK PLACE, N.Y.

UNITED STATES PATENT OFFICE.

JAMES HENRY THORP, OF NEW YORK, N. Y.

IMPROVEMENT IN COAL-OIL STOVES.

Specification forming part of Letters Patent No. 140,743, dated July 8, 1873; reissue No. 5,989, dated July 28, 1874; application filed July 21, 1874.

*To all whom it may concern:*

Be it known that I, JAMES HENRY THORP, of the city, county, and State of New York, have invented certain Improvements in Coal-Oil Stoves, of which the following is a specification:

The object of this invention is to dispense with the use of water-wicks for cooling the wick-tubes of the burners, and at the same time to provide for the cooling of said tubes above the wick-adjusting ratchet-wheels.

The invention consists in a water chamber or chambers, extended upward at the side or sides of the wick-tube above the aforesaid ratchet-wheels, and communicating with a water-chamber in such manner that the water in the latter will force the water to the requisite height hereinbefore indicated in the aforesaid chamber. The invention further comprises a series of chambers, provided between the wick-adjusting ratchet-wheels, at one side of the wick-tubes, in combination with the water-reservoir, whereby provision is made for the requisite elevation of water at the said side of the wick-tubes, without interference with the location or operation of the ratchet-wheels. The invention further embraces a novel combination of pipes with the water-chamber contiguous to the wick-tubes and the water-reservoir, whereby the flow of water from the reservoir to the chambers and the control of the height of water in the latter by that of the former are established.

Figure 1:
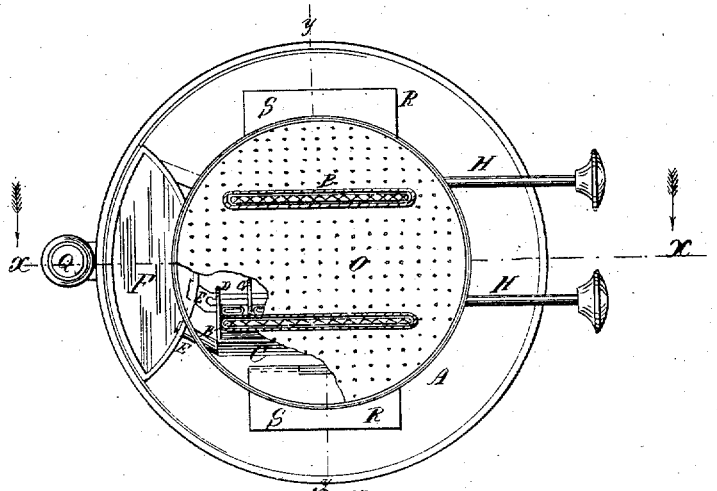
Figure 2:
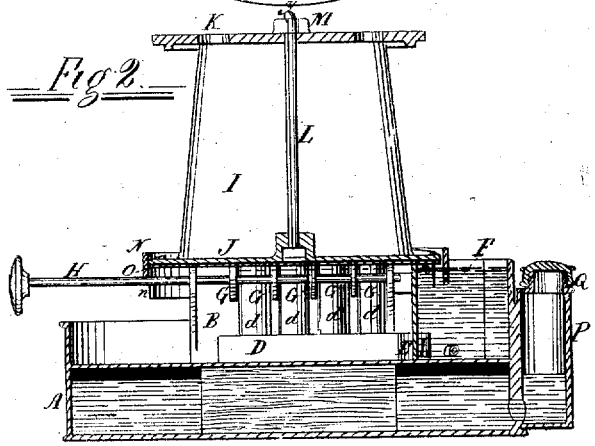
Figure 3:
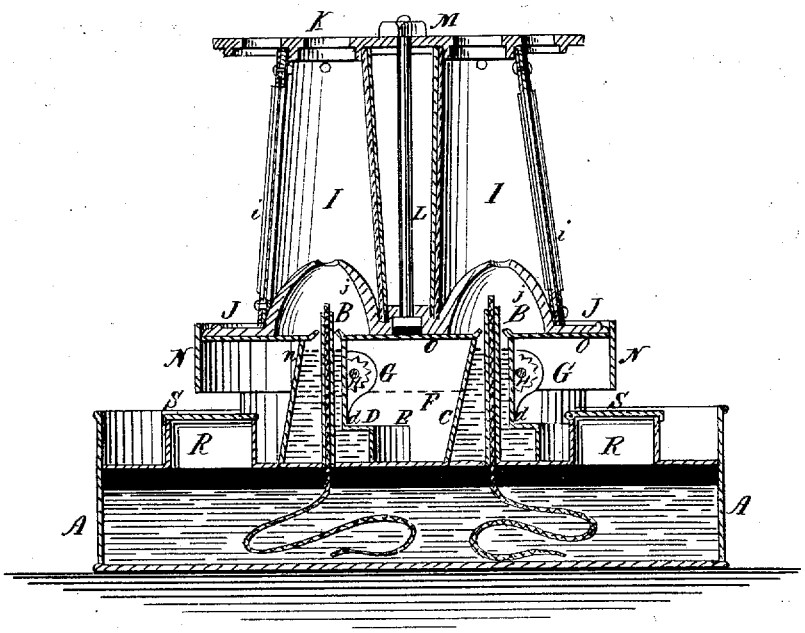

In the accompanying drawings, Figure 1 is a plan view of my improved oil-stove with the chimney removed. Fig. 2 is a vertical section of the stove, including the chimney, the line *x x*, Fig. 1, indicating the plane of section. Fig. 3 is a vertical section of the same on the line *y y*, Fig. 1.

From the base A of the lamp, constituting the oil-reservoir, rise the wick-tubes B, on each side of which are water-chambers C and D, rising nearly to the top of the wick-tube, and communicating through horizontal pipes or ducts E with the water-reservoir F. In order to accommodate the toothed wheels G, which are attached to the longitudinal shafts H, and project into the wick-tubes B for the purpose of elevating and lowering the wick, the water-chamber D on the side of the wick-tubes to which the elevator is applied are separated toward their upper ends, taking the form of flat tubes *d'*, each occupying the intervening space between the adjacent elevator-wheels. Pieces of pasteboard may, if desired, be introduced into the water-chambers C and D, of sufficient thickness to prevent water slopping over on the oil-wicks in moving the lamp. The chimney is preferably formed of sheet-iron tubes, I, with mica windows, *i*, fitted into their lower ends to the cast-iron deflector-plate J, the "deflecting-cones" *j* of which are elongated, to adapt them to the long wick-tubes. The upper ends of the chimneys are fitted to a cast perforated plate, K, and the whole secured together by a bolt, L, and nut M. The base-plate J of the chimney rests on a perforated safety-plate, O, supported by the wick-jackets C D, and surrounded by a hoop or rim, N, which rests at one side on the wall of the water-reservoir F, and at the other on the elevator-shafts H. The said hoop forms a neat finish, and assists in keeping the chimney in place. This mode of supporting the chimney enables me to dispense with legs resting on the deck of the lamp or stove. Notches *n* are formed in the lower edge of the hoop N, to adapt it to fit over the elevator-shafts, and over the edge of the water-reservoir. In addition to the customary feeding-opening P, through which the reservoir A is supplied with oil, and which is closed by a screw-cap, Q, domes R, rising from the deck of the lamp and covered by hinged lids S, are especially provided, to give access to the wicks T within the reservoir, which sometimes is necessary—as, for example, if the wicks become foul or are turned too low, and so escape from the elevator-wheels. The hinged lids also serve a useful purpose as safety-valves, in the event of the oil in the reservoir becoming heated so as to generate gas, which, when confined, produces pressure and endangers explosion.

Among the advantages of my improvements may be mentioned the following: The water-reservoir extends to a sufficient height above the rim of the lamp to admit of keeping the water in the chambers C and D nearly on the level of the tops of the wick-tubes, causing a greater evaporation of water, the vapor coming in direct contact with the flames, thereby intensifying the heat, producing more perfect combustion, and preventing odor. The peculiar construction of the water-tanks prevents any oil which may be accidentally spilled from being carried up by the water, so as to cause smoke or smell. Movable legs resting on the deck of the lamp and employed to support the chimney are objectionable, on account of causing rust, and consequently leakage. These difficulties are entirely obviated by my mode of supporting the chimney.

The entire stove is cleanly and simple in its operation, and can be safely and conveniently used, even by parties not familiar with the working of oil-stoves.

What I claim as my invention is—

1. A water chamber or chambers extended above the wick-adjusting ratchet-wheels at the side or sides of the wick-tubes, in combination with the water-reservoir communicating with such chamber or chambers, and providing, by the height of water within it, for the elevation of the water in the chamber or chambers nearly or quite to the tops of the wick-tubes, and above the ratchet-wheels, substantially as and for the purpose set forth.

2. The series of chambers provided between the wick-adjusting ratchet-wheels at one side of the wick-tubes, in combination with the water-reservoir communicating therewith by means of the pipe or passage E, substantially as and for the purpose set forth.

3. The water-chambers C and D, conducting-pipes E, and reservoir F, all combined and arranged to operate as described.

JAMES HENRY THORP.

Witnesses:
JAMES A. WHITNEY,
M. F. HALLECK.